United States Patent Office 2,978,501
Patented Apr. 4, 1961

2,978,501

STABILIZED CARBOXYLIC MONOMERS

Quandt M. Adams, Paducah, Ky., assignor to The B. F. Goodrich Company, New York, N.Y., a corporation of New York No Drawing. Filed June 2, 1958, Ser. No. 739,437

3 Claims. (Cl. 260—526)

This invention relates to stabilized monomeric alpha-beta olefinically unsaturated monocarboxylic acids and more particularly pertains to compositions comprising monomeric alpha-beta olefinically unsaturated monocarboxylic acids containing controlled amounts of phenothiazine as the sole stabilizing ingredient.

It is known in the art that monomeric alpha-beta olefinically unsaturated monocarboxylic acids such as acrylic acid and methacrylic acid, particularly those acids known as "glacial" acrylic and methacrylic acids, have a strong tendency to polymerize spontaneously when they are allowed to stand for long periods of time in the uninhibited or pure state. Because of the violent and exothermic nature of this polymerization it has been found necessary in the past to inhibit the spontaneous polymerization especially during the shipping of these acids by the addition of inhibitors such as hydroquinone, hydroquinone monomethyl ether, p-tertiary butyl catechol, copper salts and the like. However, because such well known polymerization inhibitors are effective only in the range of from about 50 to about 500 parts per million based on the monomeric acid it is generally necessary that the inhibitor be separated from the monomer by a distillation, extraction, or adsorption step before the monomer is ready for use in polymerization. Polymerizations which are carried out with monomeric acid containing any of the above-mentioned well-known inhibitors generaly have excessively long induction periods, require exceptionally high catalyst levels and the polymeric products are colored.

Accordingly, it is an object of this invention to provide monomeric alpha-beta olefinically unsaturated monocarboxylic acids which are stabilized against spontaneous polymerization even when aged at 50° C. for at least two weeks. It is another object of this invention to provide stabilized monomeric alpha-beta olefinically unsaturated monocarboxylic acids which are clear and colorless even when aged at 50° C. for at least two weeks. It is still another object to provide stabilized monomeric alpha-beta olefinically unsaturated monocarboxylic acids which per se are substantially as useful for preparing polymers as the unstabilized monomeric acid. These and other objects and advantages of the present invention will become more apparent to those skilled in the art from the following description and examples.

I have discovered a composition of matter comprising a monomeric alpha-beta olefinically unsaturated monocarboxylic acid having from 3 to 4 carbon atoms and having a terminal $CH_2=$ group of at least 95% purity to which has been added a controlled amount of from about 2 to about 10 parts per million of phenothiazine as the sole stabilizing ingredient said composition being stable against spontaneous polymerization for a period of at least two weeks at a temperature of 50° C. but being substantially as useful for preparaing polymers as the unstabilized monomeric acid.

The monomeric acids embodied in this invention are represented by acrylic and methacrylic acids.

The polymerization inhibitor embodied in this invention is phenothiazine which has the structural formula

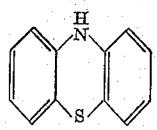

The stable, colorless monomeric acid compositions of this invention can contain from about 2 to about 10 parts per million of phenothizine. Quantities of phenothiazine below this minimum level do not prevent spontaneous polymerization of the monomer effectively and levels of phenothiazine in excess of 10 parts per million, for example 30 parts per million, have an adverse effect on polymerization of the monomer even in the presence of a polymerization catalyst and color often develops in the monomer and polymers at these high levels of inhibitor.

The most preferred range of phenothiazine in this invention is from about 2 to about 7 parts per million based on the monomeric acid. The combination of glacial acrylic acid and 3 parts per million of phenothiazine, for example, remains free of polymer and color after aging at 50° C. for two weeks. On the other hand, the combination of glacial acrylic acid and 3 parts per million of phenothiazine is readily polymerized in a conventional polymerization recipe and is indistinguishable from uninhibited glacial acrylic acid in this respect.

The quantity of phenothiazine present in a sample of a monomeric acid is determined by adding to a Nessler tube a 50 ml. sample of the acid to be tested, 2 ml. of reagent grade concentrated hydrochloric acid and 2 ml. of saturated bromine water. The Nessler tube is then inverted once for mixing and the red color which develops is compared after 15 minutes with a set a standards previously prepared from stabilizer-free acrylic acid to which were added known quantities of phenothiazine and which had been treated with hydrochloric acid and bromine water in the above-described manner.

The following examples are given to illustrate the products of this invention.

*Example 1*

A 22 ml. sample of the acid to be tested is placed in a six dram straight walled vial. The vial is then closed with a polyethylene stopper which has been punctured with a pin for the purpose of eliminating the pressure differential between the interior and exterior of the vial which develops on heating, thus preventing loss of the stopper and sample. The stoppered vial is next placed in a rack in a 50° C. circulating air oven and the contents of the vial are checked periodically for the first appearance of polymer and color. The stabilized monomeric acids which remain free of color and polymer after two weeks at 50° C. and are acceptable in the polymerization experiments described in Example II are included within the scope of the present invention.

Stabilized glacial acrylic acids were prepared and aged in the above-described manner with the following results.

| Phenothiazine in Mixture, p.p.m. | Aging Time at 50° C. |
|---|---|
| 0 | Polymer formed in less than 5 days. |
| 1 | Polymer formed in less than 7 days. |
| 2 | No polymer or color in 14 days. |
| 3 | Do. |
| 4 | Do. |
| 5 | Do. |
| 6 | No polymer or color in 20 days. |
| 7 | No polymer or color in 30 days. |
| 10 | No polymer, slight color in 30 days. |
| 20 | No polymer, colored in 53 days. |

Similar results were obtained when glacial methacrylic acid was substituted for acrylic acid in the above experiment.

*Example II*

Glacial acrylic acid-phenothiazine mixtures containing variable amounts of phenothiazine were used in the following polymerization recipe:

|  | G. |
|---|---|
| Glacial acrylic acid | 50 |
| Dry benzene | 450 |
| Caprylyl peroxide | 0.25 |

The ingredients were batch charged in a glass reactor equipped with a water-cooled reflux condenser, stirrer and gas inlet tube. A flow of nitrogen of approximately 0.25 cubic foot per hour was passed from the gas inlet tube through the polymerization mixture and the reaction temperature was brought to 70° C. by means of external heat. The induction period at 70° C. and the total polymerization time was determined in each case. The polymerizations were carried to approximately 98–100% conversion in each case.

| Phenothiazine in acid, p.p.m. | Induction Period, minutes | Polymerization, hours | Color of Polymer |
|---|---|---|---|
| 0 | 0 | 1.5 | colorless. |
| 2 | 0 | 1.5 | Do. |
| 3 | 0 | 1.5 | Do. |
| 4 | 0 | 1.5 | Do. |
| 5 | 0 | 1.5 | Do. |
| 7 | 0 | 1.5 | Do. |
| 10 | 0 | 1.5 | Do. |
| 20 | 15 | 2 | pink. |

When glacial methacrylic acid-phenothiazine mixtures were employed in place of the acrylic acid-phenothiazine mixtures above comparable results were obtained. The acrylic acid-phenothiazine and methacrylic acid-phenothiazine compositions embodied in this invention show the behavior of the uninhibited monomers when they are interpolymerized with each other and with other vinyl monomers.

The above examples serve to illustrate this invention which is limited in scope only by the appended claims.

The embodiments of the invention in which an exclusive property or privilege is claimed are defined as follows:

1. A composition of matter comprising a member selected from the group consisting of acrylic acid and methacrylic acid of at least 95% purity to which has been added a controlled amount of from about 2 to about 10 parts per million of phenothiazine as the sole stabilizing ingredient said composition being stable against spontaneous polymerization for a period of at least two weeks at a temperature of 50° C.

2. A composition of matter comprising acrylic acid of at least 95% purity to which has been added a controlled amount of from about 2 to about 7 parts per million of phenothiazine as the sole stabilizing ingredient said composition being stable against spontaneous polymerization for a period of at least two weeks at a temperature of 50° C.

3. A composition of matter comprising methacrylic acid of at least 95% purity to which has been added a controlled amount of from about 2 to about 7 parts per million of phenothiazine as the sole stabilizing ingredient said composition being stable against spontaneous polymerization for a period of at least two weeks at a temperature of 50° C.

References Cited in the file of this patent

UNITED STATES PATENTS

| 2,035,620 | Semon | Mar. 31, 1936 |
| 2,105,284 | Groll et al. | Jan. 11, 1938 |
| 2,263,013 | Scott | Nov. 18, 1941 |
| 2,576,009 | Goertz | Nov. 20, 1951 |
| 2,576,094 | Barthel | Nov. 27, 1951 |
| 2,609,343 | Saunders et al. | Sept. 2, 1952 |
| 2,863,851 | O'Brien | Dec. 9, 1958 |

OTHER REFERENCES

Hackh's Chemical Dictionary, 3rd ed. (1944), page 67.